United States Patent
Kuribayashi

(10) Patent No.: US 11,453,150 B2
(45) Date of Patent: Sep. 27, 2022

(54) METHOD FOR MANUFACTURING RESIN PIPE

(71) Applicant: THE YOKOHAMA RUBBER CO., LTD., Tokyo (JP)

(72) Inventor: Nobuaki Kuribayashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/294,773

(22) PCT Filed: Jul. 26, 2019

(86) PCT No.: PCT/JP2019/029450
§ 371 (c)(1),
(2) Date: May 18, 2021

(87) PCT Pub. No.: WO2020/110369
PCT Pub. Date: Jun. 4, 2020

(65) Prior Publication Data
US 2021/0354350 A1 Nov. 18, 2021

(30) Foreign Application Priority Data
Nov. 30, 2018 (JP) .............................. JP2018-224539

(51) Int. Cl.
*B29C 45/14* (2006.01)
*B29C 45/37* (2006.01)
(Continued)

(52) U.S. Cl.
CPC .......... *B29C 45/1459* (2013.01); *B29C 45/37* (2013.01); *B29K 2705/00* (2013.01); *B29L 2023/22* (2013.01)

(58) Field of Classification Search
None
See application file for complete search history.

(56) References Cited

U.S. PATENT DOCUMENTS 6,182,707 B1 * 2/2001 Shiraki ................ B29C 45/261
138/177
2003/0131853 A1 7/2003 Wall
(Continued)

FOREIGN PATENT DOCUMENTS

DE 197 47 021 A1 4/1999
DE 10 2015 225 937 A1 6/2017
(Continued)

OTHER PUBLICATIONS

English Translation of JPH08281691A (Year: 1996).*
English Translation of JPH06155509A (Year: 1994).*

*Primary Examiner* — Timothy Kennedy
*Assistant Examiner* — Olukorede Esan
(74) *Attorney, Agent, or Firm* — Carrier Blackman & Associates, P.C.; William D. Blackman; Joseph P. Carrier

(57) ABSTRACT

A holding portion having a diameter larger than that of a cavity is formed in communication with the cavity, in an area of a two-part type mold, the area including a portion corresponding to an annular groove. Subsequently, an insert member formed in a cylindrical shape and provided with, on an outer circumferential surface, the annular groove having no step in a groove surface is fitted to the holding portion, and then the mold is closed. On an inner circumferential surface of the insert member, a surface treatment layer having a surface roughness rougher than those of other portions of the insert member is formed. Molten resin is injected into the cavity; thereafter, an assist material is injected into the cavity to mold the resin into a desired pipe body. Then, the insert member and the pipe body are integrated along with curing of the resin.

14 Claims, 6 Drawing Sheets

(51) Int. Cl.
*B29K 705/00* (2006.01)
*B29L 23/00* (2006.01)

(56) References Cited

U.S. PATENT DOCUMENTS

| | | | |
|---|---|---|---|
| 2017/0320247 A1* | 11/2017 | Aizawa | B29C 45/14311 |
| 2018/0250855 A1 | 9/2018 | Koch | |
| 2019/0070761 A1 | 3/2019 | Duenkelmann | |
| 2019/0389105 A1* | 12/2019 | Nomizo | B29C 45/1418 |

FOREIGN PATENT DOCUMENTS

| | | | | |
|---|---|---|---|---|
| JP | H06-155509 A | | 6/1994 | |
| JP | H06155509 A | * | 6/1994 | B29C 45/16 |
| JP | H07-19389 A | | 1/1995 | |
| JP | H07-299838 A | | 11/1995 | |
| JP | H08-281691 A | | 10/1996 | |
| JP | H08281691 A | * | 10/1996 | B29C 45/1704 |
| JP | H10-113953 A | | 5/1998 | |
| JP | 2003-181868 A | | 7/2003 | |
| JP | 2011-033158 A | | 2/2011 | |
| JP | 2012-153086 A | | 8/2012 | |
| WO | 2017/203896 A1 | | 11/2017 | |

\* cited by examiner

METHOD FOR MANUFACTURING RESIN PIPE

TECHNICAL FIELD

The present invention relates to a method of manufacturing a resin pipe and particularly relates to a method of manufacturing a resin pipe in which a resin pipe having no step, the step due to a parting line of a mold, in an annular groove on an outer circumferential surface can be manufactured more simply by resin injection molding such as a gas assist molding method using an assist material.

BACKGROUND ART

A gas assist molding method in which in the event of molding a resin pipe by resin injection molding, molten resin is injected into a mold and then high-pressure gas such as nitrogen gas is injected into the mold is known (for example, see Patent Document 1). Instead of high-pressure gas, water, metal beads, or resin beads may be injected as an assist material into the mold at high pressure.

In general, a two-part type mold is used as a mold, and thus a step is formed due to a parting line of the mold on an outer circumferential surface of a molded resin pipe. In a case where the resin pipe includes, on the outer circumferential surface thereof, an annular groove in which a sealant such as an O-ring is fitted, a step is generated in the annular groove, and thus this step causes sealing properties of the sealant to be reduced.

In order to avoid such a step in the annular groove, a joint is provided, the joint configured such that an end portion of an inner cylinder is formed to have a small diameter and a fitting body including a flange portion is fitted to the end portion and such that the end portion having the small diameter and the fitting body constitute a sealant fitting groove (paragraphs 0018 to 0020 of Patent Document 2, drawings, and the like). In the event of molding the inner cylinder, a cylindrical molding mold movable along an axial direction of the inner cylinder is used. After injecting resin, the cylindrical molding mold is moved along the axial direction of the molded inner cylinder to be removed from the inner cylinder, and thus the inner cylinder can be configured such that the outer circumferential surface of the end portion having the small diameter has no step.

However, there is a need to prepare the cylindrical molding mold that moves as just described, and a step of fitting the fitting body to the inner cylinder after the molding step is required. Accordingly, there is room for improvement in more simply manufacturing a resin pipe including an annular groove on an outer circumferential surface.

CITATION LIST

Patent Literature

Patent Document 1: JP 2003-181868 A
Patent Document 2: JP 2011-33158 A

SUMMARY OF INVENTION

Technical Problem

An object of the present invention is to provide a method of manufacturing a resin pipe in which a resin pipe having no step, the step due to a parting line of a mold, in an annular groove on an outer circumferential surface can be manufactured more simply by resin injection molding such as a gas assist molding method using an assist material.

Solution to Problem

In order to achieve the object described above, in a method of manufacturing a resin pipe according to an embodiment of the present invention, a resin pipe has an annular groove formed on an outer circumferential surface thereof. The resin pipe is manufactured by injecting resin that is molten into a cavity formed in a mold of a two-part type, and by subsequently injecting an assist material into the cavity and curing the resin that is injected. The method includes a first step of forming a holding portion in an area of the mold cavity, the area including a portion corresponding to the annular groove, such that the holding portion has a diameter larger than that of the cavity and is in communication with the cavity. The method also includes steps of fitting, to the holding portion, an insert member having a hollow cylindrical shape and provided with, on the outer circumferential surface, the annular groove having no step in a groove surface thereof, and closing the mold. The method further includes a step of injecting the resin that is molten into the cavity to form a pipe body and to integrate the resin that is cured and the insert member, wherein a portion of the pipe body is disposed inside of the insert member, and wherein the insert member is joined to the pipe body and becomes an integral part of the resin pipe.

Advantageous Effects of Invention

According to an embodiment of the present invention, by using the insert member having a cylindrical shape and provided with, on the outer circumferential surface, the annular groove having no step in the groove surface, the resin pipe is injection molded with the two-part type mold. Even in such a case, a step due to a parting line of the mold is not formed in the annular groove. Since the insert member can be integrated with the injected resin in the resin injection molding process, it is not necessary to bond the insert member to the resin in a post-process. As a result, the resin pipe having no step, the step due to the parting line of the mold, in the annular groove on the outer circumferential surface can be more simply manufactured.

BRIEF DESCRIPTION OF DRAWINGS

FIG. 1A is a longitudinal cross-sectional view and FIG. 1B is a transverse cross-sectional view.

As illustrated in FIGS. 1A-1B and 2, a resin pipe 6 manufactured according to an embodiment of the present invention is configured such that a pipe body 7 made of resin and an insert member 8 having an annular shape are integrally bonded together. Specifically, the insert member 8 protruding from an outer circumferential surface of the pipe body 7 toward an outer side in a radial direction is disposed at an end portion in a longitudinal direction of the pipe body 7 having a cylindrical shape.

DESCRIPTION OF EMBODIMENTS

Figure 1A:
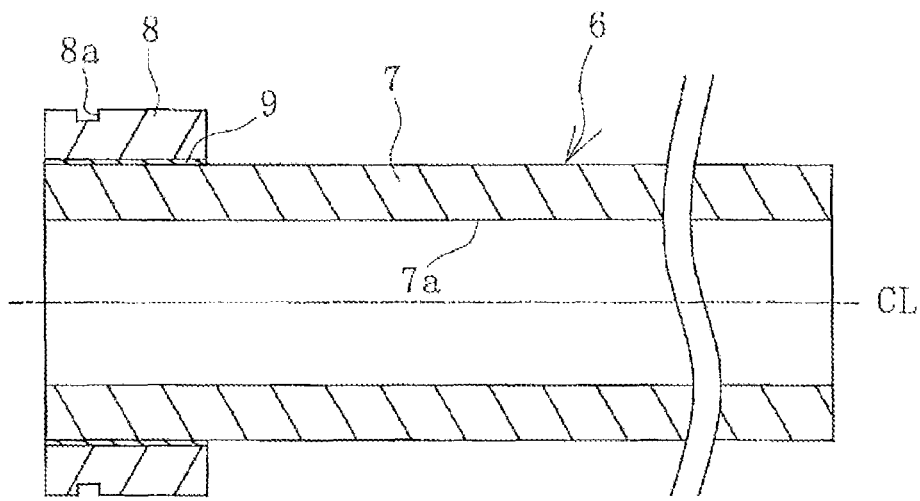
FIGS. 1A-1B illustrate a resin pipe manufactured according to an embodiment of the present invention, where

A method of manufacturing a resin pipe according to an embodiment of the present invention will be described based on an embodiment illustrated in the drawings.

Figure 1B:
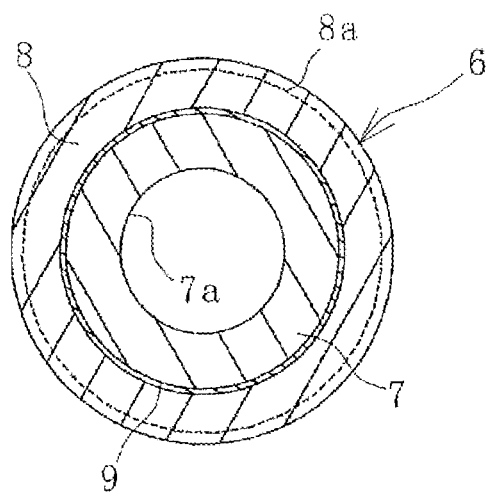
Figure 2:
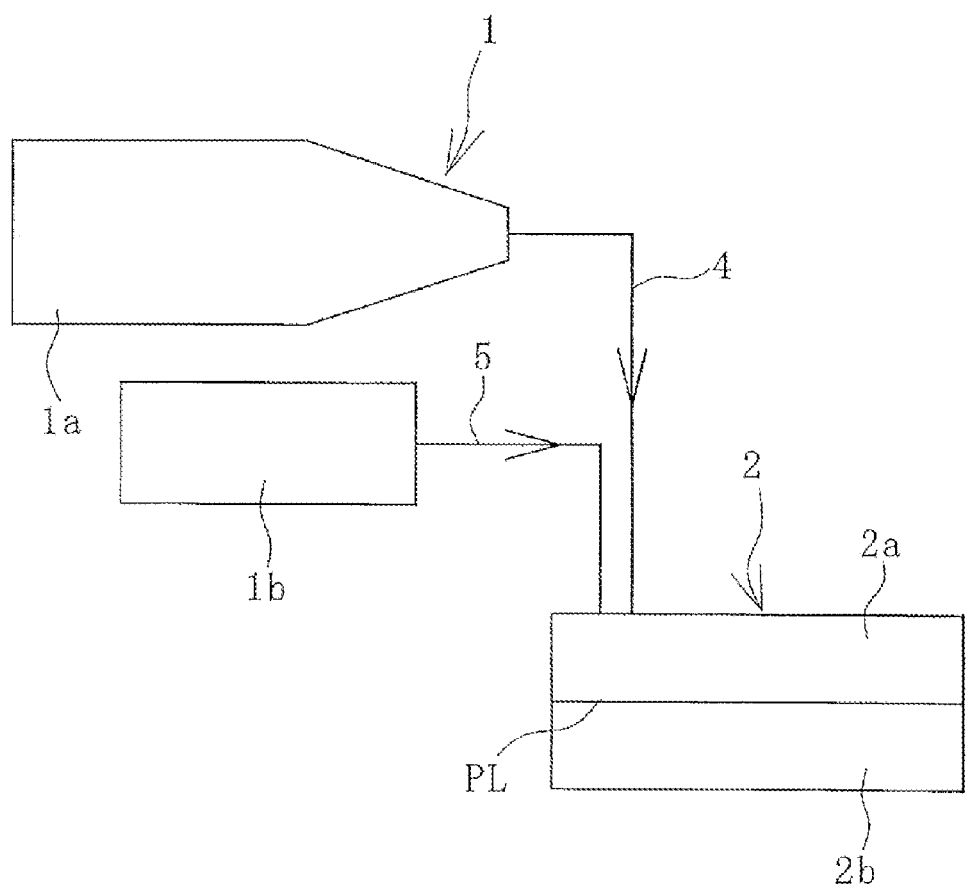
FIG. 2 is an explanatory diagram illustrating a forming device configured to manufacture a resin pipe.

As illustrated in FIGS. 1 and 2, a resin pipe 6 manufactured according to an embodiment of the present invention is configured such that a pipe body 7 made of resin and an insert member 8 having an annular shape are integrally bonded together. Specifically, the insert member 8 protruding from an outer circumferential surface of the pipe body 7 toward an outer side in a radial direction is disposed at an end portion in a longitudinal direction of the pipe body 7 having a cylindrical shape.

In this embodiment, a surface treatment layer 9 is formed on an inner circumferential surface of the insert member 8, and the pipe body 7 and the insert member 8 are integrated via the surface treatment layer 9. The insert member 8 is integrated at a desired position in a longitudinal direction of the pipe body 7. Since the shape of the resin pipe 6 is determined by space restrictions such as an installation location, the pipe body 7 is not limited to a straight pipe shape as in this embodiment and may be a bent pipe. A dash-dot-dash line CL in the drawing indicates a center line passing through the center of a transverse cross-section of a pipe path 7a.

The insert member 8 includes an annular groove 8a extending continuously in a circumferential direction on an outer circumferential surface. The insert member 8 is made of resin or metal. The insert member 8 preferably uses a material having a rigidity (breaking stress) that is equal to or greater than that of a resin forming the pipe body 7. In the case of the resin insert member 8, the same type (specification) of resin as the resin forming the pipe body 7 may be used, or a different type (specification) of resin may be used. In the case of the metal insert member 8, aluminum or an aluminum alloy is used for weight reduction.

The annular groove 8a of the insert member 8 has no step on a groove surface thereof. In the case of the resin insert member 8, the annular groove 8a is formed, for example, by machining on the outer circumferential surface of the extrusion molded cylindrical body made of resin. Alternatively, the annular groove 8a can be formed by machining on the outer circumferential surface of the injection molded cylindrical body made of resin. In the case of the metal insert member 8, the annular groove 8a is formed, for example, by machining. In this way, the annular groove 8a having no step on the groove surface can be formed. The groove surface of the annular groove 8a is processed into a smoother surface by performing polishing as necessary.

Note that the surface treatment layer 9 may be disposed accordingly. In the drawings, the layer thickness is illustrated in an exaggerated manner as an increased thickness for ease of viewing the surface treatment layer 9. The surface treatment layer 9 has a surface roughness rougher than those of other portions of the insert member 8. The surface treatment layer 9 is formed by machining or chemical treatment. As this machining, cutting machining or the like that forms recesses and protrusions on the inner circumferential surface of the insert member 8 can be used. As this chemical treatment, etching or treatment identical to etching that forms fine recesses and protrusions on the inner circumferential surface of the insert member 8 can be used.

The resin pipe 6 is manufactured using a forming device 1 illustrated in FIG. 2. The forming device 1 includes: a cylinder 1a configured to inject molten resin 4 into a mold 2 (2a, 2b); and an assist material injection unit 1b configured to inject an assist material 5 into the mold 2.

The appropriate type of resin 4 is selected from various resins 4 that can be injected, depending on the performance or the like required for the resin pipe 6. For example, in the case of manufacturing the resin pipe 6 for an air conditioner to be mounted on an automobile, for example, polyamide, polyphenylene sulfide, or the like is used as the resin 4.

The assist material 5 may be a known material. An appropriate material is selected from gas such as nitrogen gas, liquid such as water, and a solid such as a metal ball or resin ball, a bullet-shaped metal block, or a resin block. A known appropriate mechanism is applied to the assist material injection unit 1b depending on the type of the assist material 5.

Figure 3:
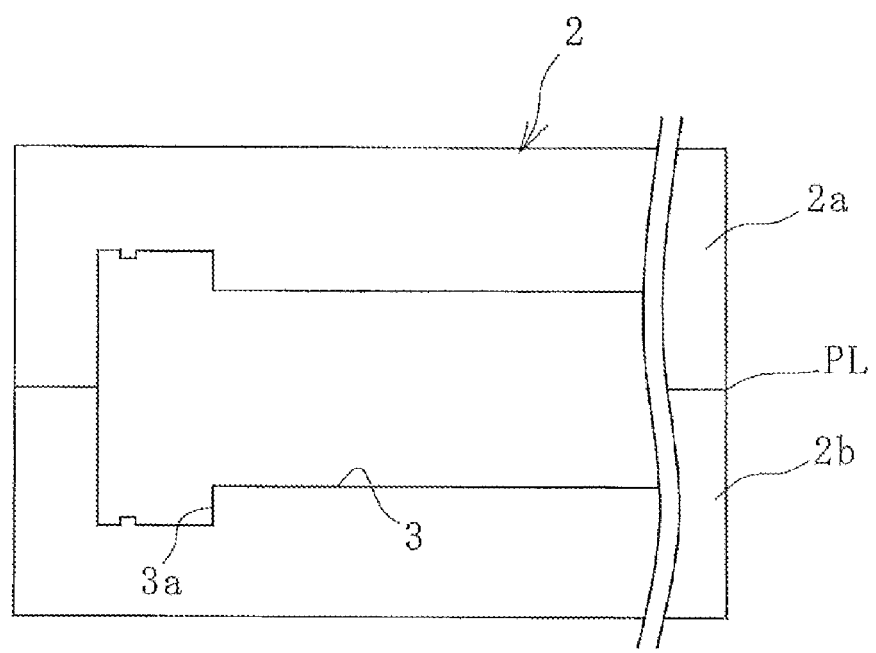
FIG. 3 is an explanatory diagram illustrating in a longitudinal cross-sectional view a mold of FIG. 2.
Figure 4:
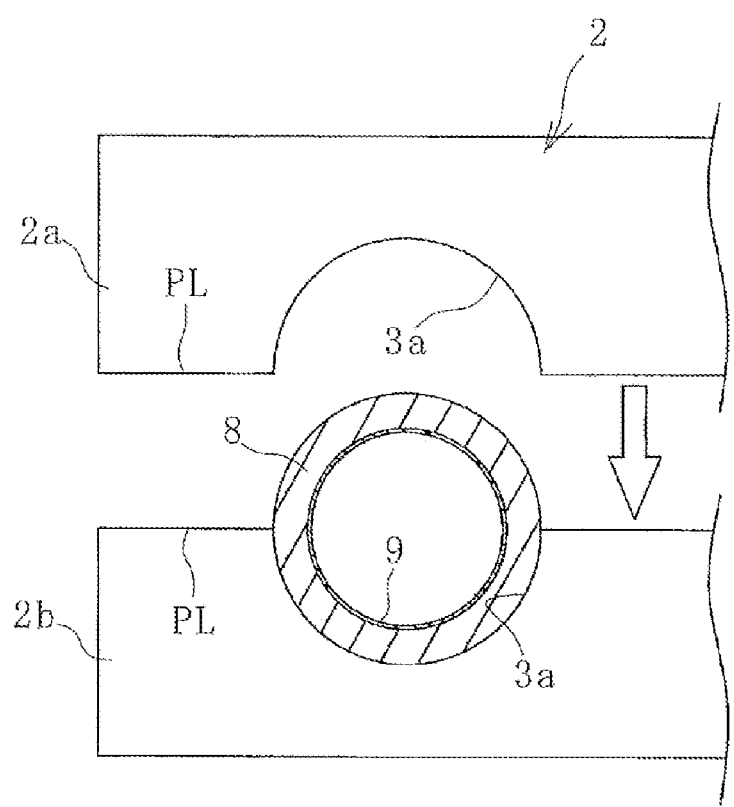
FIG. 4 is an explanatory diagram illustrating in a transverse cross-sectional view a state where an insert member is set and closed in the mold of FIG. 3.

As illustrated in FIGS. 3 and 4, the mold 2 is a so-called two-part type. The mold 2 includes one mold 2a and the other mold 2b to be assembled together. The molds 2a, 2b are bonded and separated via a parting line PL as a boundary.

A cavity 3 that is a hollow cavity is formed in the mold 2. The cavity 3 extends in a shape identical to that of the resin pipe 6 to be manufactured. A runner connecting via a gate to the cavity 3 is formed in the mold 2. This runner is connected to an injection nozzle of the forming device 1 via a sprue formed in the mold 2. A discharge portion for the assist material 5 injected into the cavity 3 is also provided in the mold 2.

In the mold 2, holding portions 3a having a diameter larger than that of the cavity 3 are formed in communication with the cavity 3 in an area including a portion corresponding to the annular groove 8a of the resin pipe 6 to be molded. In other words, a hollow having an outline identical to the insert member 8 is formed in the mold 2 to be continuously connected to an outer circumferential side of the cavity 3.

Next, an example of the procedures of a method of manufacturing a resin pipe according to an embodiment of the present invention will be described.

Figure 5:
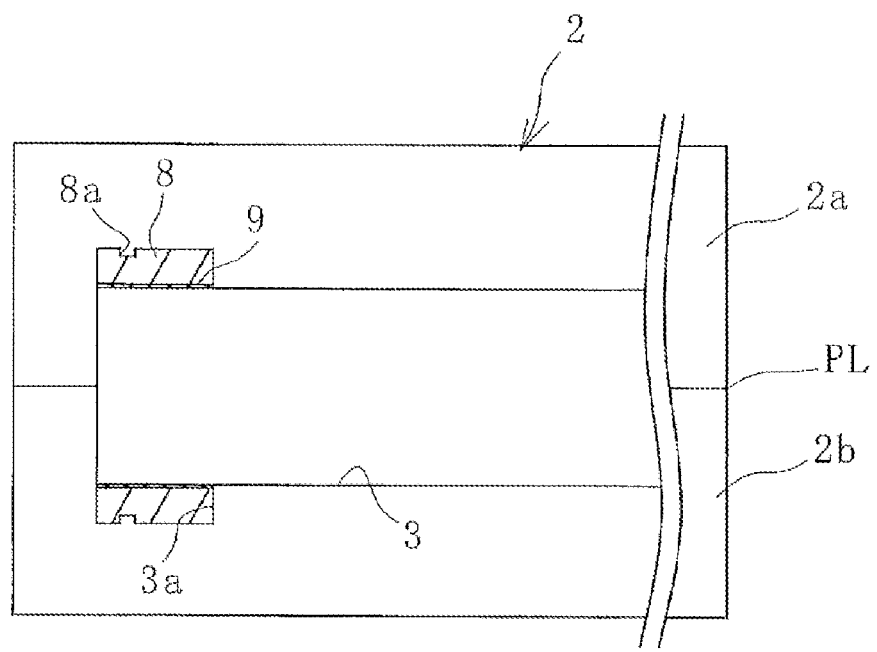
FIG. 5 is an explanatory diagram illustrating in a longitudinal cross-sectional view a state where the mold of FIG. 4 is closed.

Before the molds 2a and 2b are closed as illustrated in FIG. 4, the insert member 8 is fitted to the holding portion 3a formed in the first mold 2b. Thereafter, as illustrated in FIG. 5, the molds 2a and 2b are assembled to be closed, and the insert member 8 is held by the holding portions 3a respectively formed in the molds 2a and 2b. The inner circumferential surface of the surface treatment layer 9 is disposed smoothly and continuously with the adjacent inner circumferential surface of the cavity 3 (substantially without step). In a case where the surface treatment layer 9 is not provided, the inner circumferential surface of the insert member 8 is disposed continuously with the adjacent inner circumferential surface of the cavity 3 (substantially without step).

Figure 6:
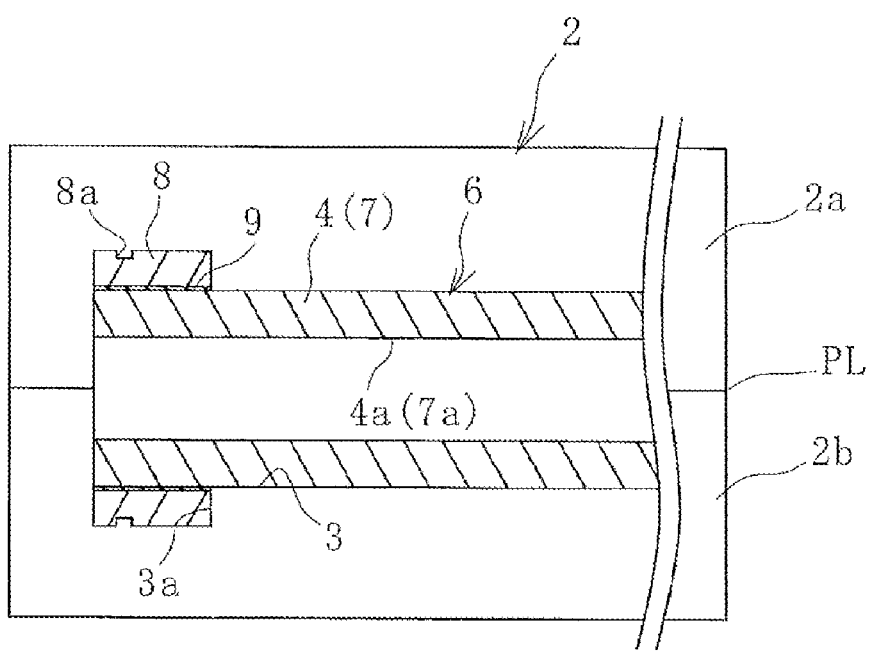
FIG. 6 is an explanatory diagram illustrating a state where resin is injected into a cavity of FIG. 5.

In this state, the molten resin 4 is injected from the cylinder 1a into the mold 2. The injected resin 4 is injected into the cavity 3 through the sprue, the runner, and the gate that are formed in the mold 2. As illustrated in FIG. 6, the wall surface of the cavity 3 is covered by the molten resin 4. In the area where the insert member 8 is disposed, the inner circumferential surface of the insert member 8 (the surface treatment layer 9) is covered by the molten resin 4.

Figure 7:
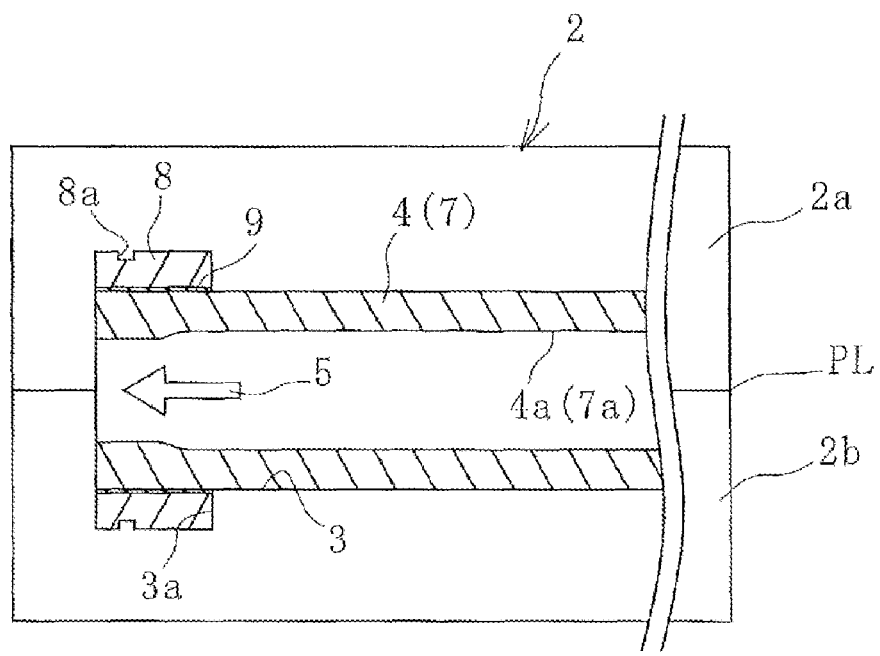
FIG. 7 is an explanatory diagram illustrating a state where an assist material is injected into the cavity of FIG. 6.

Next, the assist material 5 is injected at a predetermined high pressure from the assist material injection unit 1b into the mold 2. As illustrated in FIG. 7, the injected assist material 5 passes the inside of the cavity 3, into which molten resin 4 is injected, at high pressure along the extension direction of the cavity 3. The assist material 5 passes, and thus an inner circumferential surface 4a of the resin 4 that has not yet completely cured is molded into a desired shape.

Thereafter, the injected resin 4 is cured, and thus the desired shape of the pipe body 7 conforming to the cavity 3 is formed, and the insert member 8 is bonded to the pipe body 7 along with curing of the resin 4. In other words, the resin pipe 6 with which the insert member 8 is integrated is manufactured along with the completion of the injection molding process of the resin 4. A sealant such as an O-ring is fitted into the annular groove 8a; however, a step is not present on the groove surface of the annular groove 8a. Consequently, desired sealing properties of the sealant can be ensured.

As just described, even when the resin pipe 6 is injection molded using the two-part type mold 2, a step due to the parting line PL of the mold 2 is not formed in the annular groove 8a. Since the insert member 8 can be integrated with the injected resin 4 in the injection molding process of the resin 4, it is not necessary to bond the insert member 8 to the resin 4 in a post-process. Consequently, the resin pipe 6 having no step, the step due to the parting line PL of the mold 2, in the annular groove 8a on the outer circumferential surface can be manufactured more simply.

By forming the surface treatment layer 9 on the inner circumferential surface of the insert member 8 in advance, the injected resin 4 enters the surface of the surface treatment layer 9 (that is, the recessed and protruded inner circumferential surface of the insert member 8). As a result, it is advantageous that the pipe body 7 and the insert member 8 are more firmly and closely integrated together.

In the surface treatment layer 9 formed by chemical treatment, the surface thereof is more finely recessed and protruded (for example, recesses and protrusions in micro-order), and thus it is increasingly advantageous to firmly integrate the pipe body 7 and the insert member 8 together. In a case where the surface treatment layer 9 is formed by machining, recesses and protrusions extending in the longitudinal direction of the pipe body 7 (injection direction of the resin 4) are formed. Consequently, the pipe body 7 and the insert member 8 are more easily brought into firm and close contact with each other.

In the area where the insert member 8 of the pipe body 7 is integrated, the presence of the insert member 8 improves pressure resistance against internal pressure due to the fluid flowing through the pipe path 7a. Consequently, in this area, the inner diameter of the pipe body 7 can be set identical to those of other areas, and in the meanwhile, the outer diameter of the pipe body 7 can be set smaller than those of other areas.

In a case where the thickness of the insert member 8 cannot be set to a large value due to restrictions of the installation space of the resin pipe 6, it is preferable to use the insert member 8 made of a material having rigidity (breaking stress) higher than that of the resin 4 forming the resin pipe 6. By forming the insert member 8 with such a material, the thickness of the insert member 8 can be thinned. On the other hand, in a case where the insert member 8 is formed with the same type of resin as the resin 4 forming the resin pipe 6, the resin pipe 6 and the insert member 8 can be more firmly integrated together.

In addition, according to an embodiment of the present invention, when the resin pipe 6 is formed in a shape that allows resin injection molding with the assist material 5, even the complexly bent resin pipe 6 can be manufactured in large quantities, and the resin pipe 6 having desired pressure resistance can be manufactured. For example, the resin pipe 6 having an inner diameter of 10 mm or less and 20 mm or greater under internal pressure of 5 MPa or higher when in use can be manufactured.

REFERENCE SIGNS LIST

1 Forming device
1a Cylinder
1b Assist material injection unit
2 (2a, 2b) Mold
3 Cavity
3a Holding portion
4 Resin
5 Assist material
6 Resin pipe
7 Pipe body
7a Pipe path
8 Insert member
8a Annular groove
9 Surface treatment layer

The invention claimed is:

1. A method of manufacturing a resin pipe, the resin pipe being manufactured by injecting resin that is molten into a cavity formed in a mold of a two-part type, and by subsequently injecting an assist material into the cavity and curing the resin that is injected, the method comprising steps of:
   machining an annular groove in an external surface of a hollow cylindrical insert member, the annular groove having no step in a groove surface thereof;
   placing the machined insert member into a holding portion in an area of the mold cavity, the area comprising a portion corresponding to the annular groove, wherein the holding portion has a diameter larger than that of other parts of the cavity and is in communication with the other parts of the cavity;
   closing the mold; and
   injecting the resin that is molten into the cavity and into an interior portion of the insert member to form a pipe body and to integrate the resin that is cured and the insert member, wherein a portion of the pipe body is disposed inside of the insert member, and wherein the insert member is joined to the pipe body and becomes an integral part of the resin pipe.

2. The method of manufacturing a resin pipe according to claim 1, wherein on an inner circumferential surface of the insert member, a surface treatment layer is formed, the surface treatment layer having a surface roughness rougher than those of other portions of the insert member.

3. The method of manufacturing a resin pipe according to claim 1, wherein the insert member is made of resin.

4. The method of manufacturing a resin pipe according to claim 3, wherein the insert member is formed of an identical type of resin to the resin injected into the cavity.

5. The method of manufacturing a resin pipe according to claim 1, wherein the insert member is made of metal.

6. The method of manufacturing a resin pipe according to claim 2, wherein the insert member is made of resin.

7. The method of manufacturing a resin pipe according to claim 6, wherein the insert member is formed of an identical type of resin to the resin injected into the cavity.

8. The method of manufacturing a resin pipe according to claim 2, wherein the insert member is made of metal.

9. A resin pipe which is a product of the method of claim 1.

10. The method of manufacturing a resin pipe according to claim 1, wherein the pipe body is formed with two open end portions.

11. A method of manufacturing a composite pipe, the method comprising steps of:

forming a hollow cylindrical insert member having an inner surface;

machining an outer surface of the insert member to form an annular groove therein, in a manner such that no step is formed in the annular groove;

optionally, polishing the outer surface of the insert member;

providing a split mold having a mold cavity formed therein, the mold cavity including a first cavity section having a first diameter, and an insert-receiving section configured to receive the insert therein, wherein the insert-receiving section is in communication with the first cavity section, and has a diameter larger than that the first diameter;

placing the insert member into the insert-receiving section of the mold, closing the mold; and injecting a molten resin into the cavity and into the inner surface of the insert member to form an uncured pipe body;

injecting an assist material into the cavity; and curing the resin, thereby integrating the pipe body and the insert member, wherein a portion of the pipe body is disposed inside of the insert member, and wherein the insert member is joined to the pipe body and becomes an integral part of the composite pipe.

12. The method of manufacturing a composite pipe according to claim 11, wherein the pipe body is formed with two open end portions.

13. The method of manufacturing a composite pipe according to claim 11, wherein the insert is made of metal.

14. A composite pipe which is a product of the method of claim 11.

* * * * *